Dec. 7, 1971  R. ROMI  3,625,098
DEVICE ADAPTABLE TO THE HEADSTOCK OF ENGINE-LATHES
ENABLING THE HEIGHT OF THE
MACHINE GEOMETRIC AXIS

Filed Sept. 3, 1969  3 Sheets-Sheet 1

INVENTOR:
ROMEU ROMI
BY
Michael S. Striker
Attorney

Dec. 7, 1971    R. ROMI    3,625,098
DEVICE ADAPTABLE TO THE HEADSTOCK OF ENGINE-LATHES
ENABLING THE HEIGHT OF THE
MACHINE GEOMETRIC AXIS

Filed Sept. 3, 1969    3 Sheets-Sheet 2

A-A

B-B

INVENTOR:
ROMEU ROMI
BY Michael S. Striker
Attorney.

United States Patent Office 3,625,098
Patented Dec. 7, 1971

3,625,098
DEVICE ADAPTABLE TO THE HEADSTOCK OF ENGINE-LATHES ENABLING THE HEIGHT OF THE MACHINE GEOMETRIC AXIS
Romeu Romi, Santa Barbara d'Oeste, Sao Paulo, Brazil, assignor to Industrias Romi S.A.
Filed Sept. 3, 1969, Ser. No. 854,899
Claims priority, application Brazil, Sept. 5, 1968, 202,046
Int. Cl. B23b 19/00
U.S. Cl. 82—28                     5 Claims

ABSTRACT OF THE DISCLOSURE

The geometrical axis of a lathe is raised to the level of a spindle offset to the main spindle, and supported on the headstock of the lathe. A gear transmission connects a gear wheel secured to the main shaft with a gear secured to the offset spindle, and has such a number of gears that the offset spindle rotates in the same sense as the main spindle, permitting the attachment of a chuck to the offset spindle.

---

The present patent application is related to a device adaptable to the headstock of engine-lathes enabling the height raising of the machine geometric axis.

Generally in the engine-lathes the diameter of the workpiece swinging over the bed or over the cross slide rest will depend upon the height at which the machine geometric axis theoretically stands. In the art said geometric axis is considered the ideal line which passes through the main spindle geometric center. So that the machining capacity in the lathes is enlarged a few artifices were imagined and put in, namely the use of gaps, dislevelling of the prismatic guideways, slidable beds, or the like, so as a result in an enlarged space for the swinging of workpieces with greater diameter over the bed. Such artifices however show a great number of shortcomings and generally they constitute an overcharge on the machine cost price.

This invention provides a solution both mechanical and economical for the problem of the increasing of the lathe machining capacity, so that mentioned machine-tools are enabled to receive and turn work-pieces having substantially larger diameters, notwithstanding the same basic structure of the engine-lathe is maintained.

Accordingly the principal subject of the present invention is to provide a device adaptable to the headstock of an engine-lathe which enables the height raising of the machine geometric axis, whereby intake means and offset output means are provided, to the offset output means or nose being adapted to the usual jaws-chuck to hold the work-piece, this way enlarging the admissible diameter simultaneously both over the bed and over the cross slide rest.

A further subject of the patent of invention herein specified is a device adaptable to the headstock of an engine-lathe which enables the height raising of the machine geometric axis, whereby the geometric axis raising is achieved by the displacement of said geometric axis through a given plane in which lies the theoretical main spindle centre line, the positioning of said displaced geometric axis on said plane being determined as a function of the dimensional characteristics of the basic engine-lathe.

A still further subject of the present invention is to provide a device adaptable to the headstock of an engine-lathe which enables the height raising of the machine geometric axis, whereby transmission means alternatively may be used, said transmission means comprising externally toothed spur gear, or externally toothed spur gear meshing an internally toothed spur gear, or further a chain and respective sprocket wheels, employed for the transmission of the rotative motion in the same rotational sense, as that of the main spindle.

Another subject of this invention is the establishment of a device adaptable to the headstock of an engine-lathe which enables the height raising of the machine geometric axis, whereby upon the geometric axis raising in the headstock the arrangement of other devices must be provided, one of said devices designed to the raising of the tailstock sleeve both raising up to the same line as that of the displaced spindle which is integral of the device applied to the headstock, so as to dimensionally transform the engine-lathe into another one having a substantially higher machining capacity.

Still a further subject of the present invention is to provide a device adaptable to the headstock of a machine-lathe, which enables the height raising of the machine geometric axis whereby either the blocks of the bed-sections adapted to the gaps or the own gaps in the bed structure are eliminated, improving the bed sturdiness and the lathe performance, not only because said gaps constitute weakening spots in the bed structure, but also because of the reduced space delivered within the gaps in front of the jaws-chuck. It must be considered yet the high cost of said blocks of bed-sections which must be added to the machine selling price.

Another subject of the present invention is the application to the headstock of the device to raise the geometric axis height in engine-lathes, to enable the economical execution of innumerable machining operations of workpieces having such diameters that normally would require the utilization of substantially larger machine-lathes, the acquisition of which consequently involving greater money investments as it occurs in the practice.

Other subjects and advantages of the invention will be apparent to those skilled in this art, upon reading the specification in following, and upon referring to the accompanying drawings, which describe and illustrate a preferred embodiment of the invention. It is clearly understood that many modifications other than those related hereinbefore may be introduced in the device, without deviation of the scope of the invention which is only limited by the extension of the appended claims.

Figure 1:
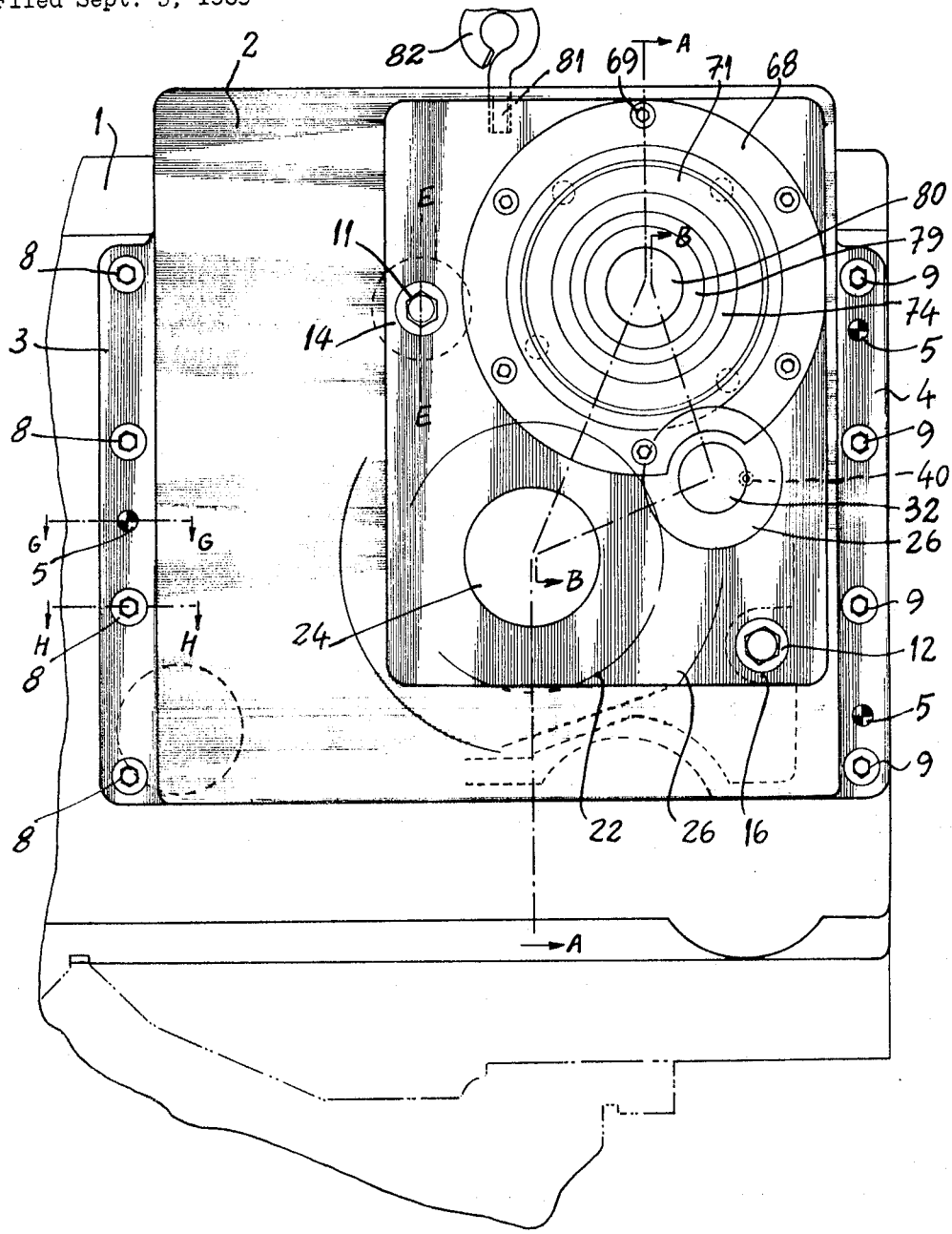
FIG. 1 is a front view of the device enabling the height raising of the machine geometric axis, as adapted to the headstock of an engine-lathe.
Figure 6:
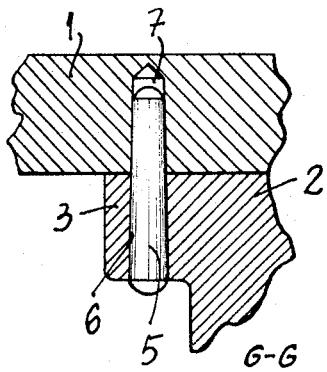
FIGS. 6, 7, 8, are cutaways executed respectively through the lines G—G, H—H, E—E of FIG. 1, to illustrate the guide means and the fixing means used to provide an absolute stability for the device adapted to the headstock of an engine-lathe.
Figure 7:
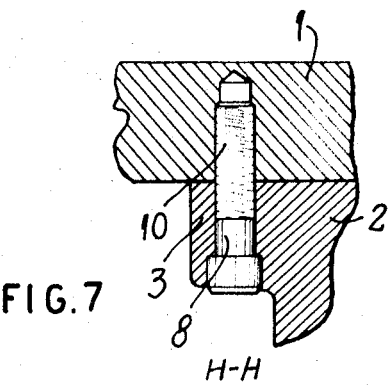
Figure 8:
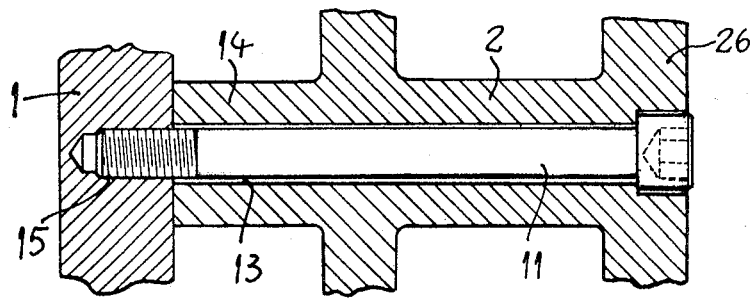

Referring now more particularly to the listed drawings in which identical numerals indicate equal or corresponding parts, 1 represents the headstock of an engine-lathe in which the case 2 is laterally adapted, said case 2 being provided with flanges 3, 4. So that the device has not the least possibility to modify the setting position even suffering the major stresses which result from the operative passages of the cutting tools to the flanges 3, 4, were passingly applied the guide pins 5 which penetrate as well the lateral wall of the headstock 1. Said guide pins 5 have a truncated cone shape and lays into the cavities 6 equally shaped and bored in the flanges 3, 4, in coincidence with the cavities 7 drilled in the lateral wall of the headstock 1, as represented in FIG. 6. The same way the bolts 8 were fitted to the flange 3 and the bolts 9 to the flange 4, the mentioned bolts 8, 9, being provided with inner hexagon head, as illustrated in FIG. 7. Said bolts 8, 9 inlay the threaded hole 10 coincidentally bored in the flanges 3, 4, in the lateral wall of the headstock 1. In order to further assure the stableness of the device bolts 11, 12, were applied, the bolt 11 passing the perforation 13 bored in the flange 14 of the case 2 and screwing in the threaded hole 15 of the headstock wall, and the bolt 12 screwing in a flap 16 formed in the rear wall of the case 2, as illustrated in FIGS. 1, 8.

To the nose 17 of the lathe main spindle, and replacing the usual jaws-chuck the device according to the invention is applied, fixedly secured through the clasp nut 18 which by the threads 19 screws in the threads 20 provided in the projecting portion 21 of the hub of the gear wheel 22. Said gear wheel 22 is driven by the rotative motion of the machine main spindle by means of the keynut 23. The case 2 is made hermetic through the cover plug 24 adapted to the hole 25 bored in the lateral wall 26 of the case 2, in order to prevent dirt from entering.

Figure 2:
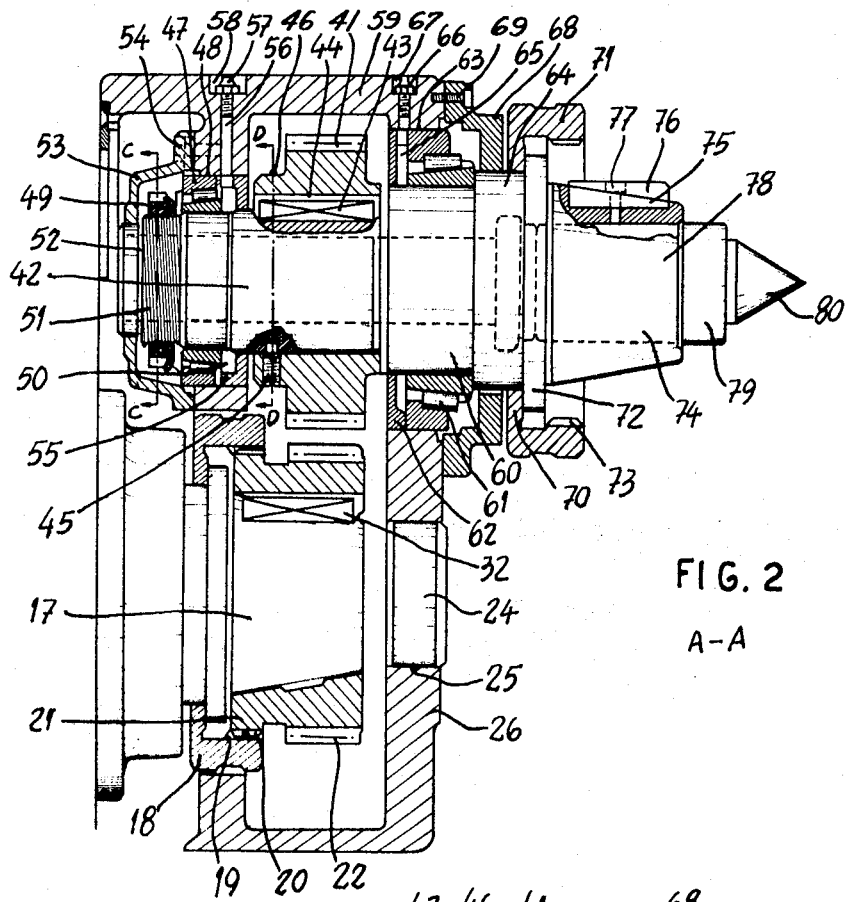
FIG. 2 is a cutaway made through the line A—A of FIG. 1.
Figure 3:
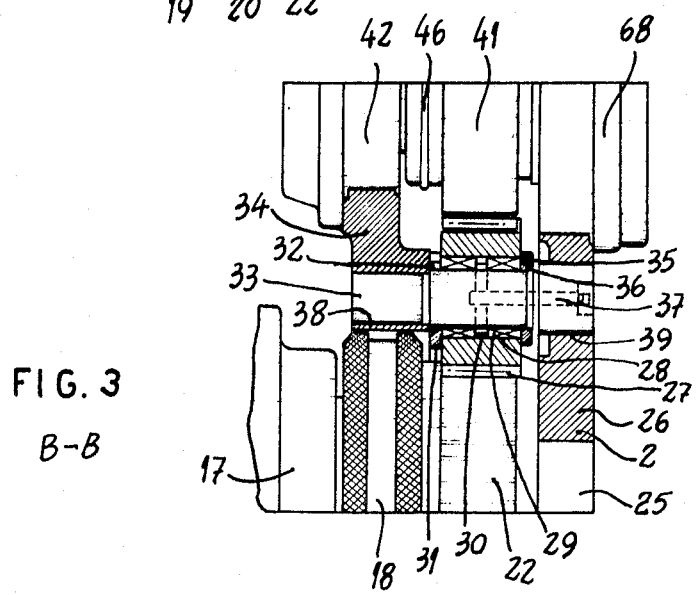
FIG. 3 represents a cut made through the line B—B of FIG. 1, to show the reverser driving, which re-establishes the rotative sense in the offset spindle which is integral of the device of the invention.
Figure 4:
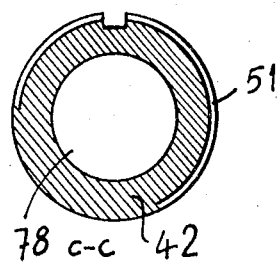
FIG. 4 is a cutaway executed according to the line C—C of FIG. 2.
Figure 5:
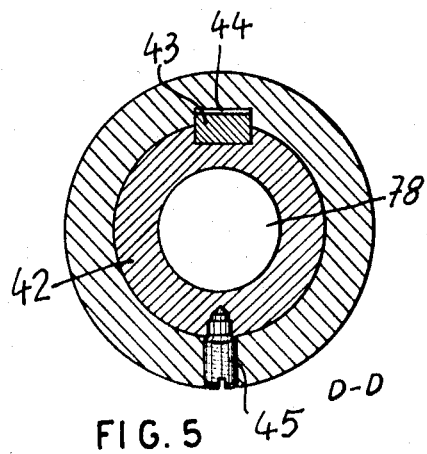
FIG. 5 illustrates a cutaway made through the line D—D of FIG. 2.

Gear wheel 22 meshes the intermediate gear wheel 27 (FIG. 3) which by the inner hollow 28 is mounted on a pair of roller bearings 29 centrally separated by means of a spacer ring 30. The mentioned pair of roller bearings 29 in one side is supported by the carrier ring 31. Said carrier ring 31 is secured by means of a pin 32 which penetrates the body of a support shaft 33 and rests in the rib 34 internally provided in the case 2. In the other side the roller bearing 29 is fixedly anchored by means of a carrier ring 35 which is secured by a pin 36 penetrating also the body of the support shaft 33. Said support shaft 33 is internally bored, as in 37, for the lubrication of the pair of roller bearings 29. In one side the support shaft 33 is embedded in the cavity 38 provided in a rib 34, and and in the other side lays in the perforation 39 bored in the lateral wall 26 of the case 2. The angular motion of said support shaft 33 is prevented by means of the screw 40 (FIG. 2).

Through the respective teeth the intermediate gear wheel 27 drives the gear wheel 41 (FIG. 2) mounted on the offset spindle 42. By the intermediate of a keynut 43 adapted to the slot 44 carved in the inner hollow of the gear wheel 41 the rotative motion is transferred from the gear wheel 41 to the off-set spindle 42. Said gear wheel 41 is prevented from axial shiftings on the offset spindle 42 by means of a bolt 45 the loosening of which is prevented by means of a clamping ring 46. In one side the off-set sipndle 42 is supported for rotative motion on the roller bearing 47 adapted to cavity 48 bored in the rib 34, and it is pressed by the washer 49 tightened to position by the clasp nut 50, which screws in the threads 51 cut on the end 52 of the offset spindle 42. This assembly is protected by a rear cover 51 fixedly secured to the rib 34 by means of a series of bolts 54. Said rear cover 53 prevents dirt from entering the case 2. The roller bearing 47 is supported also on an inner cover 55 which envelops loosely the offset spindle 42. Said roller bearing 47 is lubricated through the greaser 57 adapted to the cavity 58 bored in the upper wall 59 of the case 2.

In the other side the gear wheel 41 by means of an inner shoulder provided in the hub is supported by a shoulder formed by the enlarged portion 60 of the offset spindle 42. On said enlarged portion 60 is adapted by the inner hollow the hub of a roller bearing 61 which in one side is closed to a peripheral flange of the inner cover 62, both roller bearing 61 and inner cover 62 embedded to a cavity 63 bored in a lateral wall 26. In the other side the above-mentioned roller bearing 61 is supported by a shoulder formed by the enlarged portion 64 of the offset spindle 42. Said roller bearing 61 is lubricated through the channel 65 which communicates with a greaser 66 adapted to the cavity 67 executed as well in the upper cover 59 of the case 2. Enveloping the enlarged portion 64 and by its inner hollow the front cover 68 is found and solidly fixed to the lateral wall 26 by a series of bolts 69. Enveloping also said enlarged portion 64 and by the respective central hole is the flanged projection 70 of the clasp nut 71 which is pressed against a circular flange 72 of the offset spindle 42. The threads 73 provided in said claps nut 71 screws in the threads provided in the proper means existing in the jaws-chuck, or in the other means designed to hold the workpiece.

The offset spindle 42 ends as a nose 74. In a slot 75 of said nose 74 a keynut 76 is adapted which is anchored by means of a screw 77. Said keynut 76 fits also a proper slot provided in the retaining and carrier means supporting the workpiece, and by the intermediate of the mentioned means the rotative motion received by the offset spindle 42 is transmitted to the workpiece. To an inner hole 78 of the offset spindle 42 the end of which shows a conical profile, the base 79 of the Morse cone 80 is adapted.

So that the device enabling the geometric axis height raising in lathes is withdrawn and assembled according to the machining requirements both for workpieces with smaller diameters and for workpieces with larger diameters, in a threaded hole 38 provided in the upper portion 59 of the case 2 a hook 82 is screwed by the respective threaded stem (FIG. 1).

Hereinbefore the component parts of the device according to the invention were described. In following the description of the operation of said device will be made:

Employing a lifting-tackle or another raising mechanism the apparatus according to the invention is lifted by the intermediate of the hook 82, so that the gear wheel 22 by means of the threads 20 is engaged to the clasp nut 18, conventionally existing in the nose of the main spindle in a machine-lathe. The guide pins 5 and the bolts 8, 9, are respectively inlaid to the holes 6, 7, 10 as well as the bolts 11, 12, to the hole 15, in order to assure absolute stableness and security to the assembly even pending the machining stresses.

The rotative motion of the main spindle is then transmitted to the gear wheel 22 through a keynut 23. From said gear wheel 22 to the intermediate gear wheel 27 which is supported by the roller bearings 29 resting on the support shaft 33. From the intermediate gear wheel 27 which re-established the rotational sense, the rotative motion is transferred to gear wheel 41. By means of the keynut 43 said gear wheel 41 transmits the motion to the offset spindle 42 which will rotate with support on the roller bearings 47, 61. From said offset spindle 42 and through the work-piece fixing means anchored through the clasp nut 71 and keynut 76, rotative motion is transmitted to the work-piece which will rotate according to the selected speed commanded to the lathe main spindle.

What I claim is:

1. In a lathe including a headstock and a main spindle mounted in the same rotatable about an axis, a device for enabling the raising of the geometrical axis of the lathe, and comprising, in combination handling means including a case; fixing means and stabilization means for attaching said case to said headstock, and including bolts and conical pins passing into cavities formed in portions of said case, said bolts and pins penetrating corresponding holes in the headstock; adaptation means and power intake means including a gear wheel, and retaining means for attaching said gear wheel to said main spindle for rotation with the same, said gear wheel having a hub with a projecting portion having a peripheral thread, and being conically shaped and formed with a key groove; an offset spindle mounted in said case; intermediate transmission means for the reestablishment of the rotational sense, including an intermediate gear wheel and rolling bearings for the same, said intermediate gear wheel meshing with said gear wheel; collecting means and means transmitting the rotary motion from said transmission means to said offset spindle, and including a gear meshing with said intermediate gear wheel, and prevented from axial shifting and internally provided with means establishing the transmission of the rotary motion from said gear to said offset spindle; supporting means for mounting said offset spindle for rotary motion, and including roller bearings mounted on said case, said supporting means enveloping said offset spindle and being provided with regulating and retaining elements; and means for transferring the rotary motion to a workpiece including a key and means for fixedly attaching a chuck to one end of said offset spindle.

2. A device according to claim 1 and comprising handle means for said device secured to said case; wherein said gear wheel has a hub with a peripherally threaded projecting portion, said retaining means including a chuck clamp nut attached to said main spindle, and threaded to said projecting threaded portion, the interior of said portion having a key groove for a key also engaging a key groove formed in said main spindle nose.

3. Device according to claim 2, and characterized by the fact that the machine geometric axis raising is achieved by the displacement of said geometric axis through a determined plane in which lies the theoretical main spindle center line, and the positioning of said geometric axis of the offset spindle said plane being determined as a function of the dimensional characteristics of the lathe.

4. Device according to claim 2, and characterized by the fact that upon the height raising of the machine geometric axis by the device adapted to the headstock of an engine-lathe, simultaneously being raised the height over the bed, as well as the height over the cross slide rest, in order to enable the swinging of a larger machining diameter all over the useful extension of the lathe.

5. Device adapted to the headstock of engine lathes enabling the height raising of the machine geometric axis, according to claim 2, and characterized by the fact that upon the height raising of the machine geometric axis by the intermediate of the device adapted to the headstock of the lathe, the machining of work-pieces having substantially larger diameters is enbaled, once the condition of co-linearity of the axis of the tailstock sleeve with the axis of the offset spindle is yielded.

References Cited
UNITED STATES PATENTS

| | | | |
|---|---|---|---|
| 335,609 | 2/1886 | Middleditch | 82—28 |
| 821,608 | 5/1906 | Carroll | 82—28 |

FOREIGN PATENTS

| | | | |
|---|---|---|---|
| 1,203,738 | 8/1959 | France | 82—28 |

LEONIDAS VLACHOS, Primary Examiner